United States Patent [19]

Menth et al.

[11] 4,312,736
[45] Jan. 26, 1982

[54] ELECTROLYSIS CELL FOR WATER DISSOLUTION

[75] Inventors: Anton Menth, Nussbaumen; René Müller, Fislisbach; Samuel Stucki, Baden, all of Switzerland

[73] Assignee: BBC Brown, Boveri & Company, Limited, Baden, Switzerland

[21] Appl. No.: 109,131

[22] Filed: Jan. 2, 1980

[30] Foreign Application Priority Data

Jan. 17, 1979 [CH] Switzerland .................. 436/79

[51] Int. Cl.³ .............. C25B 9/00; C25B 11/06; C25B 11/12
[52] U.S. Cl. .................. 204/255; 204/268; 204/269; 204/290 R; 204/294
[58] Field of Search .............. 204/254–258, 204/268–270, 283, 290 R, 284, 290 F, 292, 294, 129, 98; 429/40

[56] References Cited

U.S. PATENT DOCUMENTS

| 2,928,783 | 3/1960 | Bacon | 204/129 X |
| 3,423,247 | 1/1969 | Darland, Jr. et al. | 429/40 |
| 3,963,592 | 6/1976 | Lindström | 204/98 |
| 4,056,452 | 11/1977 | Campbell | 204/290 R X |
| 4,118,305 | 10/1978 | Oloman et al. | 204/269 X |
| 4,187,165 | 2/1980 | Appleby | 204/254 |
| 4,197,178 | 4/1980 | Pellegri et al. | 204/255 |
| 4,209,368 | 6/1980 | Coker et al. | 204/283 X |
| 4,210,511 | 7/1980 | Campbell et al. | 204/290 R X |
| 4,210,512 | 7/1980 | Lawrance et al. | 204/257 |

FOREIGN PATENT DOCUMENTS

1407452  9/1975 United Kingdom ............ 204/290 R

*Primary Examiner*—Delbert E. Gantz
*Assistant Examiner*—Donald R. Valentine
*Attorney, Agent, or Firm*—Oblon, Fisher, Spivak, McClelland & Maier

[57] ABSTRACT

An electrolysis cell for water electrolysis, consisting of a synthetic polymer foil as a solid substance electrolyte having attached on both sides thereof finely porous and coarsely porous substances serving as electrodes, and two bipolar plates serving to provide electricity, whereby the finely porous substance carries the anode catalyst on the oxygen side and the solid electrolyte carries the cathode catalyst on the hydrogen side.

10 Claims, 2 Drawing Figures

ELECTROLYSIS CELL FOR WATER DISSOLUTION

BACKGROUND OF THE INVENTION

1. Field of the Invention:

This invention relates to an electrolysis cell with a solid substance electrolyte for water dissolution, wherein an alternating bipolar plate is provided on both the anode side and the cathode side, with porous substances between the plates and electrolyte, and more particularly, to such a cell wherein the electrolyte is made of a synthetic polymer, and the electrolyte is structured as a foil with a catalyst on both sides thereof.

2. Description of Prior Art:

Electrolysis cells for water dissolution by using organic solid substance electrolytes in the form of synthetic polymer foils are familiar. See for example, U.S. Pat. Nos. 4,039,409 and 4,057,479. The numerous problems involved in supplying water and electricity, in the contacts with the solid electrolytes, and in removing gases, have caused manufacturers to attempt to solve these problems by selecting particular material and by designing particular structures and models. Because no single material optimally fulfills the aforementioned conditions even closely, one usually has to depend upon compound constructions and compromises.

The conditions for an even distribution of electricity as well as the suffusing of solid electrolyte foils on their entire surface, as well as an internal contact of the foils with the actual electrodes were only partially fulfilled in the above-mentioned designs. For laboratory purposes and small dimensions, such types of constructions may be adequate, but for large surfaces of electrolysis cells in industrial plants, they would require corresponding modifications.

SUMMARY OF THE INVENTION

The principal object of the invention is to provide an electrolysis cell for hydrolysis which allows for an economically efficient production of hydrogen under high pressure on a large scale by using a synthetic polymer as a solid substance electrolyte having as simple a structure and as low production costs as possible. The cell should distinguish itself in its high yield in electricity, high energy efficiency level, and high degree of operating safety.

According to the invention, this object is solved by providing a solid substance electrolyte made of a synthetic polymer material, and wherein an alternating bipolar plate is provided on both the anode side and the cathode side thereof for the supply of electricity and water. A porous structure is also provided on both sides of the electrolyte, and the electrolyte is structured as a foil with a catalyst on both sides thereof.

The multi-plated structure of industrial electrolysis units, and in the case of water dissolution, in accordance with the type of commonly available filter presses, is essentially determined by its very nature. Therefore, what is involved is to provide as even a distribution of electricity and water as possible and as even a production of gas across the entire surface as possible. In the present case, this is achieved by using a specific, graduated, multi-layered structure for the individual components. Depending upon the function, various material combinations are available for this, which range from rust-free steel and graphite for the bipolar plates to metal structures and compound substances or their oxides for catalysts.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein.

DETAILED DESCRIPTION OF THE PREFERRED EMBODIMENT

Figure 1:
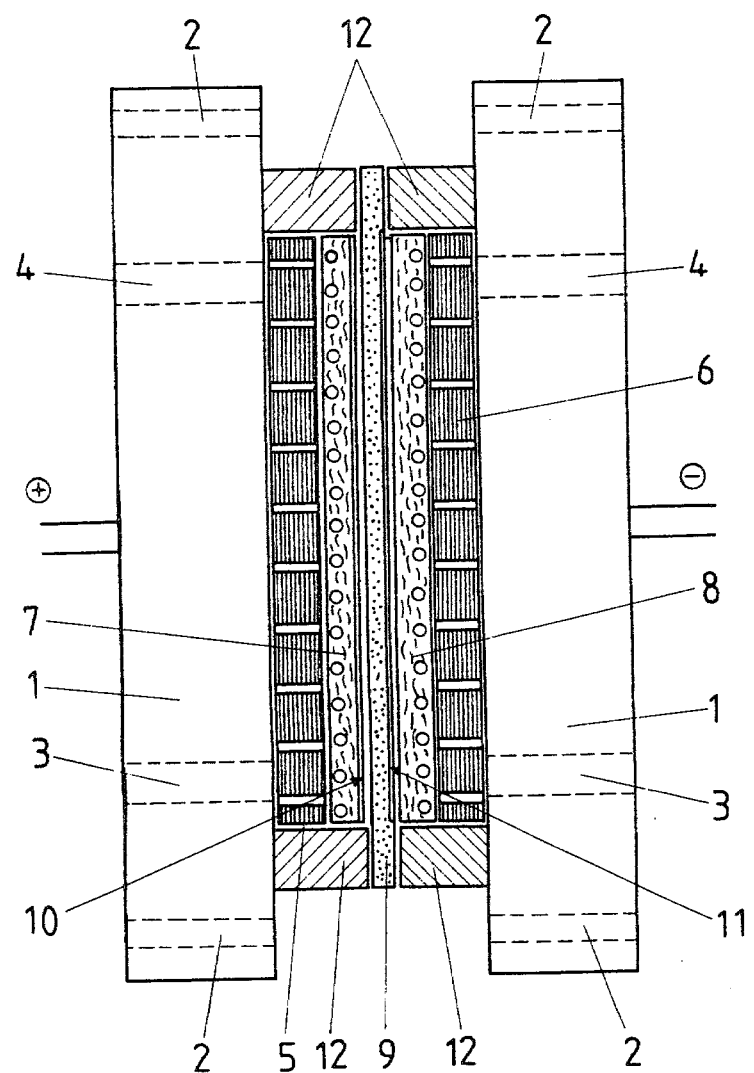
FIG. 1 is a cross-sectional view of an electrolysis cell structured in a layered way and with a special sealant.

In FIG. 1, the cross-section of the first model of an electrolysis cell with a multi-layered structure is depicted. A bipolar plate 1, functioning in an alternating way as an anode and as a cathode, consists of rust-free steel or of a compound substance on a graphite basis, having longitudinal holes 2 for axial support rods. Longitudinal holes 3 for the supply of water and longitudinal holes 4 are set at regular intervals from each other on the same plate, but are aligned with subsequent plates in such a way that unobstructured canals or channels for separate yields of oxygen and hydrogen are formed. Layers 5 and 6 of porous substances are formed on the anode and cathode sides of the cell, and provide for the first distribution of water and serve to collect the gases, as well as to conduct electricity to the actual electrodes. The coarsely porous layers 5 and 6 consist of platinated titanium metal or of graphite. The electrodes themselves are in the form of layers 7 and 8 (anode and cathode sides, respectively) of a finely porous substance attached to the layers 5 and 6 and consist of a metallic structure made of titanium, tantalum, platinum, copper, bronze or brass or of a compound substance on the basis of tetrafluorinated ethylene with metal netting as a covering.

In a preferred design, the layer 7 of finely porous substance on the anode side consists of a tantalum or titanium structure with graphite compound substances pressed onto it for use as a catalyst agent. In the center of the cell, there is a solid electrolyte 9 consisting of a synthetic polymer, preferably constructed on the basis of perfluorinated sulfuric acids (e.g., trade mark "Nafion" from Du Pont). On the anode side ($O_2$ side) of the electrolyte, there is a catalyst 10, which, in the most beneficial way, is adhesively secured to the surface of the finely porous substance 7 serving as a catalyst agent. On the cathode side ($H_2$ side) of the solid electrolyte 9, there is a catalyst 11 which is preferably anchored adhesively to the surface layer of the solid electrolyte 9. The catalyst 10 consists of a mixture of platinum metal oxides, for example 80% $IrO_2$ and 20% $RuO_2$, in the preferred design, whereas the catalyst 11 consists preferbly of platinum metal available in a finely dispersed form.

Seals 12 are attached to the cell and consist, for example of polyvinyl chloride or tetrafluorine ethylene pressed against the solid substance electrolyte 9 in the form of a foil due to the axial stresses from the bipolar plates 1 on the front side.

In a preferred version of the cell, the bipolar plates 1 are composed of rust-free steel; the coarsely porous substances or layers 5 and 6 of a platinated titanium metal; the finely porous substances or layer 7 on the anode side, of a tantalum structure with a mixture of graphite and tetrafluorine ethylene pressed upon it as an agent for the catalyst 10; and the finely porous substance or layer 8 on the cathode side, of a brass structure with a mixture of graphite and tetrafluorine ethylene pressed upon it as an agent for the catalyst 11.

Figure 2:
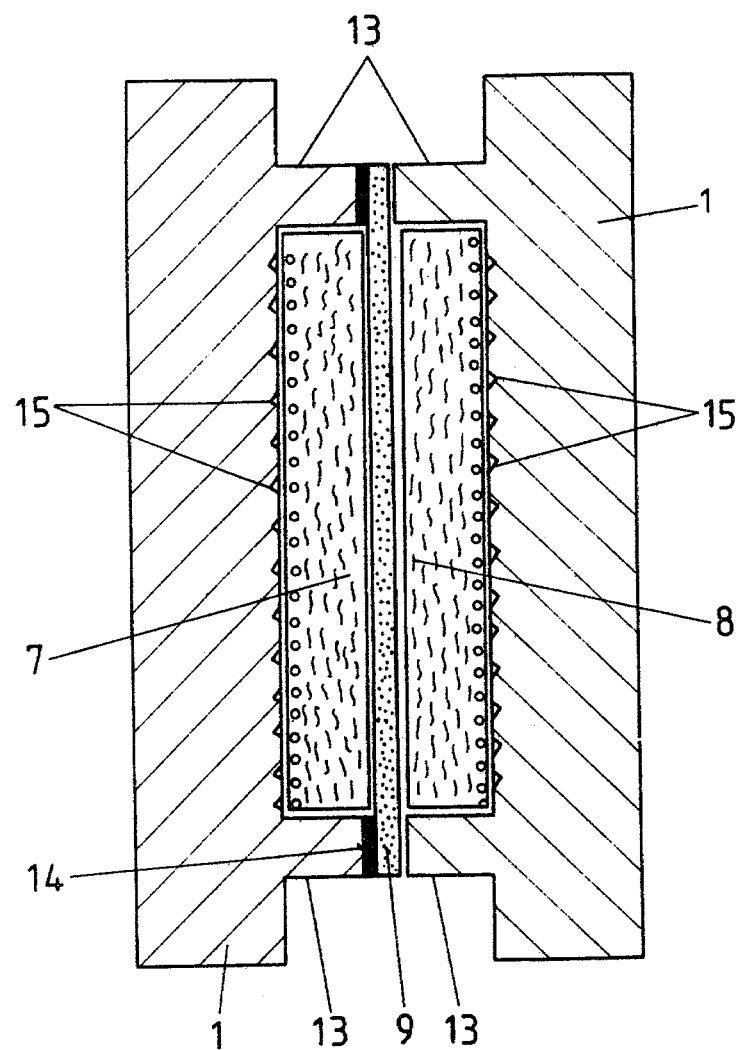
FIG. 2 is a cross-sectional view of an electrolysis cell of another design without a special sealant.

FIG. 2 depicts the cross section of an electrolysis cell without a special sealant. The construction can basically be described as the same for that shown in FIG. 1, except that the difference from FIG. 1 consists in a flange or rib 13 on each of the bipolar plates 1 which closes off the cell at its periphery and guarantees a seal by frontal pressure at the edge of the solid electrolyte 9. In order to avoid corrosive appearances and electrolytic side-effects on the bipolar plates 1, another frontal insulation 14 is designed on the anode side ($O_2$ side). In the present model, the bipolar plates 1 with the concomitant coarsely porous substances (layers 5 and 6 in FIG. 1) form a unit with regard to the material used, so that separate coarsely porous substances are no longer required. For this purpose, the bipolar plates 1 consist of a graphite compound substance and is located on the tangential frontal side toward the finely porous substance or layers 7' & 8' with a channel grid 15.

In a preferred version of the cell, the bipolar plates 1 consist of the described graphite compound substance and have a channel grid 15, whereas the finely porous substance or layer 7' on the anode side is composed of a tantalum or titanium structure which contains the catalyst (80% $IrO_2$/20% $RuO_2$), and the finely porous substance or layer 8' on the cathode side is constructed of a graphite-tetrafluorine ethylene compound substance covered with bronze and brass netting. The solid electrolyte 9 lies upon the porous platinum layer which serves as a catalyst 11' and which is attached solidly to the surface on the cathode side.

The advantages of the new cells are the even flow of water and electricity to the electrodes and the optimal functioning of the catalysts due to their specific sequence on each of the supporting substances. This applies in particular for the catalyst installed on the solid electrolyte on the cathode side, which provides for the best possible contact to the finely porous substances at the seam and has a high specific surface.

The electrolysis cell is suited for water dissolution under high pressures and can be used up to about 100 bar.

What is claimed as new and desired to be secured by Letters Patent of the United States is:

1. An electrolysis cell with a solid substance electrolyte made of synthetic polymer for water dissolution, wherein, for the supply of electricity and water, on each side of the solid electrolyte there is a bipolar plate functioning alternately as an anode and as a cathode, with layers of coarse porous material and fine porous material attached to each said bipolar plate, and the solid substance electrolyte between the finely porous substances, with catalysts on both sides of the electrolyte.

2. An electrolysis cell according to claim 1, wherein the bipolar plates each have an encircling rib near the confronting peripheries thereof in such a way that two diametrically positioned ribs of adjacent bipolar plates are disposed in confronting, aligned relationship with each other, and an insulating material is between the confronting surfaces of the ribs, to form the sealing of the cell.

3. An electrolysis cell according to either claim 1 or 2, wherein the bipolar plates consist of a rust-free steel.

4. An electrolysis cell according to either claim 1 or 2, wherein the coarse porous material layers consist of a platinated titanium metal.

5. An electrolysis cell according to either claim 1 or 2, wherein the fine porous material layers consist of a metallic compound selected from the group consisting of titanium, tantalum, platinum, copper, bronze or brass.

6. An electrolysis cell according to either claim 1 or 2, wherein the bipolar plate, and the coarse porous material layers form a unit with regard to the material used, which consists of a graphite compound substance with a frontal channel grid.

7. An electrolysis cell according to either claim 1 or 2, wherein on the anode side there is a fine porous material layer which consists of a metal structure selected from the group consisting of tantalum and titanium, with graphite compound substances pressed onto it as a catalyst agent.

8. An electrolysis cell according to either claim 1 or 2, wherein on the cathode side there is a catalyst consisting of a platinum metal and which is in a finely dispersed form, and which is united solid with the surface of the solid substance electrolyte.

9. An electrolysis cell according to either claim 1 or 2, wherein the bipolar plates consist of rust-free steel, and the coarse porous material layers on both sides thereof consist of a platinated titanium metal, and furthermore, that the fine porous material layer on the anode side consists of a tantalum structure with graphite compound substances pressed onto it, with a catalyst comprising a mixture of 80%, $IrO_2$ and 20% $RuO_2$, and that the fine porous platinum surface is coated to the solid substance electrolyte.

10. An electrolysis cell according to claim 2, wherein the bipolar plates consist of a graphite compound substance with channel grids forming a unit with the coarse porous material layer, that furthermore, the fine porous material layer on the anode side is made of tantalum as a catalyst agent for a mixture serving as a catalyst composed of 80% $IrO_2$ and 20% $RuO_2$, and that the fine porous material layer on the cathode side consists of a graphite-tetrafluorine ethylene compound substance covered with bronze netting, and a catalyst on the cathode side comprising a porous platinum surface covering connected solidly with the solid substance electrolyte.

* * * * *